United States Patent [19]
Dekker

[11] Patent Number: 5,355,548
[45] Date of Patent: Oct. 18, 1994

[54] APPARATUS COMPRISING AN ELECTRIC MOTOR WITH VARIABLE MOTOR POWER

[75] Inventor: Jan H. Dekker, Hoogeveen, Netherlands

[73] Assignee: U.S. Philips Corporation, New York, N.Y.

[21] Appl. No.: 132,435

[22] Filed: Oct. 6, 1993

Related U.S. Application Data

[63] Continuation of Ser. No. 856,772, Mar. 24, 1992, abandoned.

[30] Foreign Application Priority Data

Mar. 29, 1991 [EP] European Pat. Off. ......... 91200754.9

[51] Int. Cl.⁵ ................................................ A47L 9/28
[52] U.S. Cl. ................................................ 15/319; 15/339
[58] Field of Search ................................. 15/319, 339

[56] References Cited

U.S. PATENT DOCUMENTS

| | | | |
|---|---|---|---|
| 1,904,973 | 4/1933 | Smellie | 15/319 |
| 2,789,660 | 4/1957 | Brown | 15/319 |
| 3,577,869 | 5/1971 | Hosokawa et al. | 15/319 X |
| 4,021,879 | 5/1977 | Brigham | 15/319 |
| 4,654,924 | 4/1987 | Getz et al. | 15/319 |
| 4,920,607 | 5/1990 | Köhn | 15/319 X |
| 4,942,640 | 7/1990 | Hayashi et al. | 15/319 |
| 4,991,253 | 2/1991 | Rechsteiner | 15/319 X |
| 5,033,151 | 7/1991 | Kraft et al. | 15/319 |
| 5,072,484 | 12/1991 | Edlund | 15/319 |

FOREIGN PATENT DOCUMENTS

| | | |
|---|---|---|
| 0370610 | 5/1990 | European Pat. Off. . |
| 0375327 | 6/1990 | European Pat. Off. . |
| 1207804 | 2/1960 | France . |
| 87/01921 | 4/1987 | PCT Int'l Appl. . |
| 2082351 | 3/1982 | United Kingdom . |

Primary Examiner—Stephen F. Gerrity
Attorney, Agent, or Firm—Ernestine C. Bartlett

[57] ABSTRACT

An apparatus, for example a vacuum cleaner, is provided which comprises an electric motor with variable motor power, a control circuit for controlling the variable motor power, and a vacuum chamber for generating a partial vacuum by means of the electric motor and, the control circuit being effective to temporarily increase the variable motor power to a power level above a nominal motor power in dependence upon the partial vacuum generated in the vacuum chamber.

11 Claims, 2 Drawing Sheets

APPARATUS COMPRISING AN ELECTRIC MOTOR WITH VARIABLE MOTOR POWER

This is a continuation of application Ser. No. 07/856,772, filed Mar. 24, 1992 now abandoned.

FIELD OF THE INVENTION

The invention relates to an apparatus comprising an electric motor with a variable motor power, a control circuit for controlling the variable motor power and a vacuum chamber for generating a partial vacuum by means of the electric motor, the control circuit comprising means for temporarily increasing the variable motor power to a power level above a nominal power level. The nominal motor power is to be understood to mean a maximum motor power, which maximum motor power can be endured by the electric motor and by the apparatus for a long period.

BACKGROUND OF THE INVENTION

Such an apparatus may be constructed, for example, as a vacuum cleaner, the vacuum chamber being provided with a dust bag. In the case of a vacuum cleaner, the temporary increase of the variable motor power to a power level above the nominal motor power is desirable, for example, for removing a thread from a carpet or for cleaning a hard-to-reach crevice. Switching on the more than nominal power will be hereafter referred to as the "boost" function.

Such an apparatus is known inter alia from patent application WO 87/01921, which corresponds substantially to U.S. Pat. No. 4,920,607, the disclosure of which is hereby incorporated by reference and which describes an apparatus constructed as a vacuum cleaner. In order to increase the variable motor power to a power level above the nominal motor power, the vacuum cleaner described in said Patent has a boost function provided by said means, which boost function is operative for a first fixed time interval (10 seconds) and a second fixed time interval after its initiation. During the first fixed time interval the boost function causes the variable motor power to be increased, the boost function being attended with a production of heat by the electric motor. Since the electric motor as well as the vacuum cleaner may be damaged as a result of the increased heat production, the first fixed time interval covers a period in which the electric motor as well as the vacuum cleaner cannot be damaged as a consequence of a continuous use of the boost function. During the second fixed time interval (20 seconds) the boost function prevents the variable motor power from being increased, the boost function being attended with a diminished heat production. The second fixed time interval covers a period after which the electric motor as well as the vacuum cleaner cannot be damaged as a result of a subsequent use of the boost function.

A disadvantage of the apparatus described in said patent application is that the increase of the variable motor power is usually discontinued prematurely as a result of the first fixed interval and is usually inhibited too long as a result of the second fixed interval.

SUMMARY OF THE INVENTION

An object of the invention is to provide an apparatus in which means are provided which effect the temporary increase of the variable motor power beyond the nominal motor power or the boost function with an improved timing.

According to the invention an apparatus comprising an electric motor with variable motor power is characterized in that means are provided and are constructed to temporarily increase the variable motor power in dependence upon a partial vacuum generated in a vacuum chamber. The invention is based on the recognition of a first fact that the electric motor as well as the apparatus cannot be damaged as a result of the temporary increase of the variable motor power if the speed of the electric motor remains substantially below a maximum speed value and on the recognition of a second fact that the partial vacuum is related to the speed of the electric motor. In accordance with the recognition of these two facts the temporary increase of the variable motor power in an apparatus in accordance with the invention is effected for a time interval related to the partial vacuum, the time interval being dictated by the partial vacuum before the increase or the partial vacuum during the increase, and the temporary increase of the variable motor power being inhibited or stopped if the partial vacuum exceeds a reference partial vacuum related to the maximum speed value.

It is to be noted that the continuous control of the variable motor power in dependence upon the partial vacuum is known, for example from U.S. Pat. No. 2,789,660 but the temporary increase of the variable motor power to a power level above the nominal motor power in dependence upon the partial vacuum is not known.

An apparatus in accordance with the invention may be characterized further in that the means comprise a pressure sensor for measuring the partial vacuum. The pressure sensor is an electronic device generating an electric signal in dependence upon the partial vacuum. By means of the signal generated by the pressure sensor the temporary increase of the variable motor power can be controlled in a simple way.

A first embodiment of an apparatus in accordance with the invention may be characterized in that the pressure sensor is constructed by means of a pressure-sensitive switch for generating a digital signal in dependence upon the partial vacuum relative to a reference partial vacuum. The temporary increase of the variable motor power can be inhibited or stopped on the basis of the generated digital signal, the reference partial vacuum being related to the maximum speed value.

The first embodiment of an apparatus in accordance with the invention may be characterized further in that the means are adapted to temporarily increase the variable motor power for a first time interval when the partial vacuum is below the reference partial vacuum, and for a second time interval when the partial vacuum is above the reference partial vacuum. In the present embodiment the temporary increase of the variable motor power can be effected for a comparatively short interval if upon initiation of the temporary increase the partial vacuum lies comparatively closely below a partial vacuum corresponding to the maximum speed value, and for a comparatively long time interval if the partial vacuum lies comparatively far below the partial vacuum corresponding to the maximum speed value. A preferred choice of the two time intervals and the reference partial vacuum precludes damage to the electric motor as well as the apparatus. In the most preferred case, the first time interval may be selected to be zero seconds.

A second embodiment of an apparatus in accordance with the invention may be characterized in that the pressure sensor is constructed by means of an analog pressure transducer for generating an analog signal in dependence upon the partial vacuum. The temporary increase of the variable motor power can be inhibited or stopped on the basis of the analog signal.

The second embodiment of an apparatus in accordance with the invention may be characterized further in that the means are adapted to temporarily increase the nominal motor power for a variable time interval, the variable time interval being dependent upon the analog signal. In the present embodiment the temporary increase of the variable motor power can be effected for a time interval in which the analog signal remains below a signal value corresponding to the maximum speed value. Since the analog signal is a variable representation of the speed the temporary increase of the variable motor power can be sustained for a variable time interval.

The second embodiment of an apparatus in accordance with the invention may also be characterized in that the pressure sensor is capable of measuring the partial vacuum both for controlling the variable motor power and for temporarily increasing the variable motor power. As already stated, it is known to control the variable motor power by means of a pressure sensor. For example, in a vacuum cleaner the variable motor power is controlled so as to maintain an air stream produced by means of the electric motor constant, yielding a constant suction of the vacuum cleaner. In an apparatus in accordance with the invention the pressure sensor can be given two functions, which saves at least one pressure sensor. The pressure sensor plays a part in the known regulation of the variable motor power and, in addition, the pressure sensor plays a part in temporarily increasing the variable motor power, the relevant time interval for this temporary increase being determined on the basis of the partial vacuum.

BRIEF DESCRIPTION OF THE DRAWINGS

The above and other (more specific) aspects of the invention will now be described in more detail with reference to the accompanying drawing, in which.

DETAILED DESCRIPTION OF THE PREFERRED EMBODIMENTS

Figure 1:
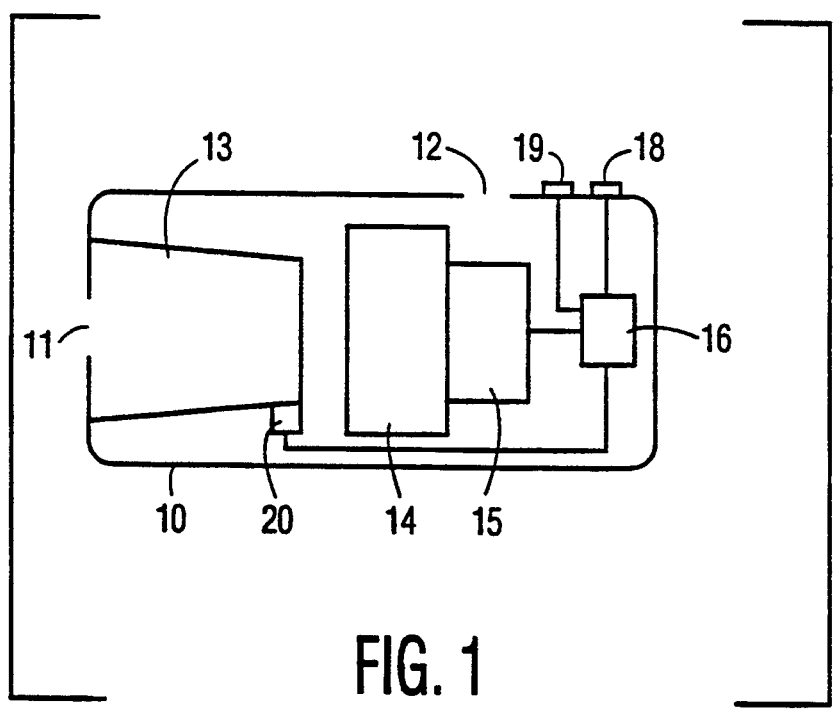
FIG. 1 shows schematically a construction of an apparatus in accordance with the invention.

As an example, the apparatus is constructed as a vacuum cleaner. The construction which is generally known from WO-87/01921 (U.S. Pat. No. 4,920,607), shows a casing 10, which is provided with an air inlet 11 and air outlet 12, a dust container 13 being connected to the air inlet 11. In order to generate an air displacement from the air inlet to the air outlet, a suction fan 14, which is driven by an electronic 15, is placed near the dust container 13, the electric motor 15 being controlled by an electronic circuit 16 and the electronic circuit 16 being adjusted by a control knob 18 and a push button 19. The control knob 18 and the push button 19 are mechanically fixed to the casing 10 and electrically coupled to the control circuit 16. As the vacuum cleaner can be controlled by the control knob 18 when being used at a power level below the nominal power level, the push button 19 has been provided to start a temporary increase of the power level to a level above the nominal power level. The apparatus in accordance with the invention comprises means for controlling the temporary increase in motor power in dependence on a partial vacuum and the construction is provided with a pressure sensor 20 which is fixed in the vacuum chamber, which vacuum chamber is constituted by a space between the air inlet 11 and the suction fan 14, the dust container 13 also being included in this space. The pressure sensor 20 is effective to convert the partial vacuum into an electric signal, which partial vacuum results from the air displacement being generated by the suction fan 14. The control circuit 16 can switch the electric motor 15 in case of an overload. The control circuit may comprise a microcomputer, which is adjusted by the control knob 18 via a first input, which operates the boost function by the push button 19 via a second input and by the pressure sensor 20 via a third input, and which is prevented from operating the boost function by the pressure sensor 20 via the third input, and which controls the electric motor 15 via a single output. The operation of the control circuit is further described with reference to FIGS. 2A and 2B.

Figure 2A:
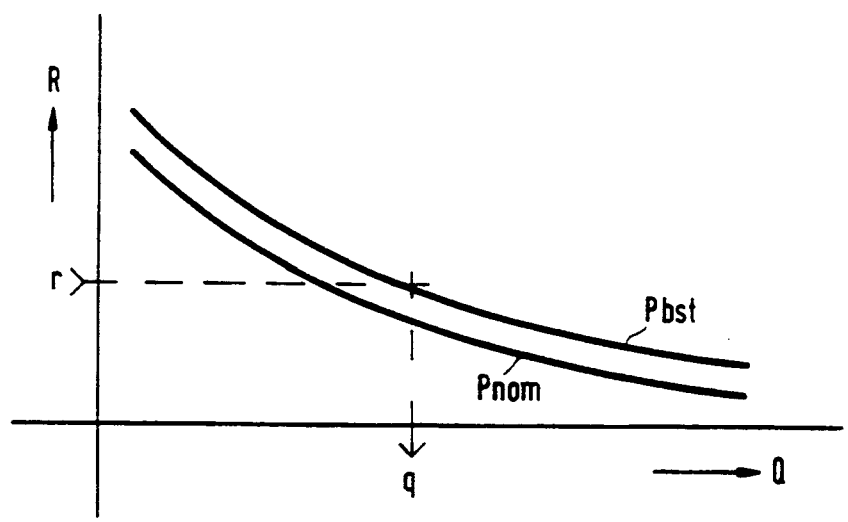
FIG. 2A shows a graph representing a speed in an apparatus in accordance with the invention as a function of an air displacement produced by the apparatus.

FIG. 2A shows a graph representing a speed in an apparatus in accordance with the invention as a function of an air displacement produced by the apparatus, the speed and the air displacement being symbolized by the letters R and Q respectively. The air displacement Q is obtained in that the apparatus has an electric motor of variable motor power, a control circuit for controlling the variable motor power, and a vacuum chamber for generating a partial vacuum by means of the electric motor, the control circuit setting the power of the electric motor to a value below a nominal motor power, Pnom. The nominal motor power, Pnom, is to be understood to mean a maximum motor power, which maximum motor power can be endured by the electric motor and by the apparatus for a long period. Since a higher motor power may be desired from time to time the control circuit comprises means for temporarily increasing the variable motor power to a power level, Pbst, above the nominal motor power Pnom, which temporary increase of the variable motor power is attended with an increased production of heat by the electric motor, which may lead to damaging of the electric motor and of the apparatus. Such damaging of the electric motor and apparatus is precluded by briefly inhibiting or duly stopping the boost in variable motor power. In accordance with the invention briefly inhibiting or duly stopping is achieved in that the means are constructed to temporarily increase the variable motor power in dependence upon the partial vacuum generated in the vacuum chamber. The invention is based on the recognition of a first fact that the electric motor as well as the apparatus cannot be damaged as a result of the temporary increase of the variable motor power if the speed of the electric motor remains substantially below a maximum speed value and on the recognition of a second fact that the partial vacuum is related to the speed of the electric motor. In FIG. 2A a letter r represents a reference speed related to the maximum speed, which reference speed r, when related to the power level Pbst, corresponds to a reference air displacement represented by a letter q.

Figure 2B:
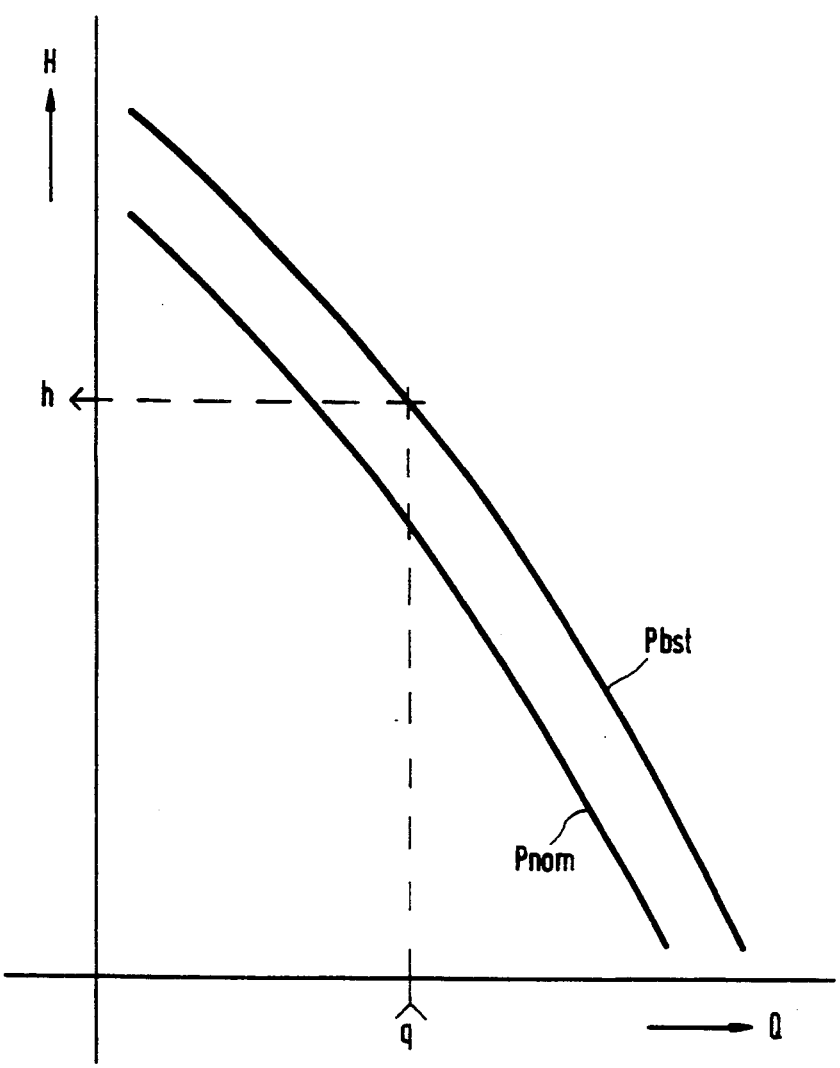
FIG. 2B is a graph representing a partial vacuum generated by an apparatus in accordance with the invention as a function of the air displacement produced by the apparatus.

FIG. 2B is a graph representing a partial vacuum generated by an apparatus in accordance with the invention as a function of the air displacement produced by the apparatus, the partial vacuum and the air displacement being symbolized by a letter H and the letter Q respectively. The letter q represents the reference air displacement, in the same way as in FIG. 2A, which reference air displacement q on the basis of the power level Pbst corresponds to a reference partial vacuum represented by a letter h. A first and a second embodiment of an apparatus in accordance with the invention will now be described hereinafter by way of illustration with reference to FIGS. 2A and 2B, the means in both embodiments comprising a pressure sensor for measuring the partial vacuum.

In the first embodiment of an apparatus in accordance with the invention the pressure sensor is constructed by means of a pressure-sensitive switch for generating a digital signal in dependence upon the partial vacuum relative to the reference partial vacuum h, a partial vacuum above the reference partial vacuum yielding a digital signal of a first signal level and a partial vacuum below the reference partial vacuum yielding a digital signal of a second signal level. On the basis of the first signal level, which corresponds to a speed above the reference speed r, the means can effect a temporary increase of the variable motor power for a first time interval. If the reference speed corresponds to the maximum speed value the first time interval may be selected to be zero seconds, although the electric motor as well as the apparatus can briefly withstand the temporary increase of the variable motor power. On the basis of the second signal level, which corresponds to a speed below the reference speed r, the means can effect the temporary increase of the variable motor power for a second time interval. If the reference speed corresponds to the maximum speed value a longer time may be taken for the second time interval because the electric motor as well as the apparatus cannot be damaged in the case of a speed below the maximum speed value.

In the second embodiment of an apparatus in accordance with the invention the pressure sensor is constructed by means of an analog pressure transducer for the generation of an analog signal in dependence upon the partial vacuum, a partial vacuum above the reference partial vacuum h yielding for example an analog signal of comparatively high signal level and a partial vacuum below the reference partial vacuum h yielding for example an analog signal of comparatively low signal level. On the basis of the signals level, which corresponds to a speed above or below the reference speed r, the means can allow the temporary increase of the variable motor power for a variable time interval, the variable time interval being for example inversely proportional to the analog signal. The temporary increase will proceed for a longer time interval as the speed of the electric motor lies further below the maximum speed because the electric motor as well as the apparatus cannot be damaged at such a speed. In the second embodiment of an apparatus in accordance with the invention the pressure sensor can be given a double function, for which double function the pressure sensor plays a part in the continuous control of the variable motor power and in the temporary increase of the variable motor power. The continuous control is utilized for example for maintaining the air displacement produced by the electric motor constant, the resulting air displacement yielding a constant suction in the case of a vacuum cleaner.

The invention is not limited to the embodiments described herein. Within the scope of the invention several modifications are conceivable to those skilled in the art. For example, the signal generated by the pressure sensor for controlling the temporary boost in the variable motor power can be processed in various manners, both prior to the boost and during the boost. Finally, it is to be noted that an apparatus in accordance with the invention can be constructed not only as a vacuum cleaner but also as a drill, a lawn-mower or another appliance.

I claim:

1. A vacuum cleaner comprising an electric motor with a variable motor power, a vacuum chamber for generating a partial vacuum by means of the electric motor, and a control circuit for controlling the variable motor power and comprising means for temporarily increasing the variable motor power to a power level above a nominal power level, said means being effective to temporarily increase the variable motor power in dependence upon the partial vacuum generated in the vacuum chamber, the temporary increase of the variable motor power being inhibited if the partial vacuum exceeds a reference partial vacuum related to a maximum speed value of the motor.

2. A vacuum cleaner as claimed in claim 1, wherein the means comprise a pressure sensor for measuring the partial vacuum.

3. A vacuum cleaner as claimed in claim 2, wherein the pressure sensor is constructed by means of a pressure-sensitive switch for generating a digital signal in dependence upon the partial vacuum relative to a reference partial vacuum.

4. A vacuum cleaner as claimed in claim 3, wherein the means are adapted to temporarily increase the variable motor power for a first time interval when the partial vacuum is below the reference partial vacuum, and for a second time interval when the partial vacuum is above the reference partial vacuum.

5. A vacuum cleaner as claimed in claim 2, wherein the pressure sensor is constructed by means of an analog pressure transducer for generating an analog signal in dependence upon the partial vacuum.

6. A vacuum cleaner as claimed in claim 5, wherein the means are adapted to temporarily increase the nominal motor power for a variable time interval, the variable time interval being dependent upon the analog signal.

7. A vacuum cleaner as claimed in claim 5, wherein the pressure sensor is capable of measuring the partial vacuum both for controlling the variable motor power and for temporarily increasing the variable motor power.

8. A vacuum cleaner comprising an electric motor with a variable motor power, a vacuum chamber for generating a partial vacuum by means of the electric motor, a control circuit for controlling the variable motor power and a pressure sensor for temporarily increasing the variable motor power to a power level above a nominal power level, said pressure sensor measuring the partial vacuum and including a pressure-sensitive switch for generating a digital signal in dependence upon the partial vacuum relative to a reference partial vacuum, said pressure sensor being adapted to temporarily increase the variable motor power for a first time interval when the partial vacuum is below the reference partial vacuum, and for a second time interval when the partial vacuum is above the reference partial vacuum.

9. A vacuum cleaner comprising an electric motor with a variable motor power, a vacuum chamber for generating a partial vacuum by means of the electric motor, a control circuit for controlling the variable motor power and a pressure sensor for temporarily increasing the variable motor power to a power level above a nominal power level, said pressure sensor measuring the partial vacuum and including an analog pressure transducer for generating an analog signal in dependence upon the partial vacuum, said pressure sensor being adapted to temporarily increase the variable motor power for a variable time interval, the variable time interval being dependent upon the analog signal.

10. A vacuum cleaner comprising an electric motor with a variable motor power, a vacuum chamber for generating a partial vacuum by means of the electric motor, a control circuit for controlling the variable motor power and a pressure sensor for temporarily increasing the variable motor power to a power level above a nominal power level, said pressure sensor measuring the partial vacuum and including an analog pressure transducer for generating an analog signal in dependence upon the partial vacuum, said pressure sensor being capable of measuring the partial vacuum both for controlling the variable motor power and for temporarily increasing the variable motor power.

11. A vacuum cleaner comprising an electric motor with a variable motor power, a vacuum chamber for generating a partial vacuum by means of the electric motor, and a control circuit for controlling the variable motor power and comprising means for temporarily increasing the variable motor power to a power level above a nominal power level, wherein said means are effective to temporarily increase the variable motor power for a time interval related to the partial vacuum generated in the vacuum chamber, the time interval being determined by at least one of (a) the partial vacuum before the increase in the variable motor power and (2) the partial vacuum during the increase in the variable motor power, the temporary increase of the variable motor power being inhibited if the partial vacuum exceeds a reference partial vacuum related to a maximum speed value of the motor.

* * * * *